United States Patent [19]

Milne

[11] 4,170,511
[45] Oct. 9, 1979

[54] SURFACE LAMINATING MACHINE

[75] Inventor: James A. Milne, Wheeling, Ill.

[73] Assignee: Pace Incorporated, Northbrook, Ill.

[21] Appl. No.: 862,975

[22] Filed: Dec. 21, 1977

Related U.S. Application Data

[63] Continuation-in-part of Ser. No. 723,026, Sep. 13, 1976, abandoned.

[51] Int. Cl.² .......................... B30B 3/00; B32B 31/20
[52] U.S. Cl. ................................. 156/498; 100/93 P;
100/93 RP; 156/311; 156/583.1; 425/407
[58] Field of Search ............... 156/309, 311, 322, 498,
156/499, 583, 312, 313, 324; 100/92, 93 RP, 93
P, 38, 144, 151, 152; 425/363, 364, 384, 394,
407, 445

[56] References Cited

U.S. PATENT DOCUMENTS

| | | | |
|---|---|---|---|
| 2,518,806 | 8/1950 | Muench | 100/92 |
| 3,011,932 | 12/1961 | Downing | 156/498 |
| 3,223,027 | 12/1965 | Suda et al. | 156/498 |
| 3,283,052 | 11/1966 | Munk | 264/248 |
| 3,471,600 | 10/1969 | Meek | 425/384 |
| 3,547,742 | 12/1970 | Cottrell | 156/311 |
| 3,753,832 | 8/1973 | Veneziale | 156/499 |
| 3,770,550 | 11/1973 | Leyitan | 156/498 |
| 3,901,758 | 8/1975 | Humphries | 156/499 |

OTHER PUBLICATIONS

Brochure, "Stiles Salgo Hot Melt Surface Laminating Machine", Stiles Machinery, Grand Rapids, Michigan.

*Primary Examiner*—Caleb Weston
*Attorney, Agent, or Firm*—Wegner, Stellman, McCord, Wiles & Wood

[57] ABSTRACT

A system is disclosed for laminating surfacing materials, such as high and low pressure laminates, paper, wood veneers, metal foils and the like, to core material, such as plywood, particle board, flake board, hard board, rigid plastic foams and the like.

The disclosure includes a machine for laminating, particularly utilizing high viscosity, hot melt adhesives within the ambient conditions of a factory. A sandwich is formed at ambient temperature with the adhesive between the laminate and core either as sheet material or precoated on the laminate or the core. The method employs a progressive heating of the adhesive and adjacent parts of the sandwich from ambient temperature through tackiness to an activating temperature followed immediately by a physical migration of the adhesive to wet out adjacent surfaces followed by a cooling of the sandwich to a mechanical bonding adhesive temperature. The machine is particularly useful in non-toxic, non-ventilated installations for laminating wherein it is desired to avoid solvent handling as well as the difficulties of melting and applying hot melt adhesives and controlling the necessary conditions thereof.

9 Claims, 8 Drawing Figures

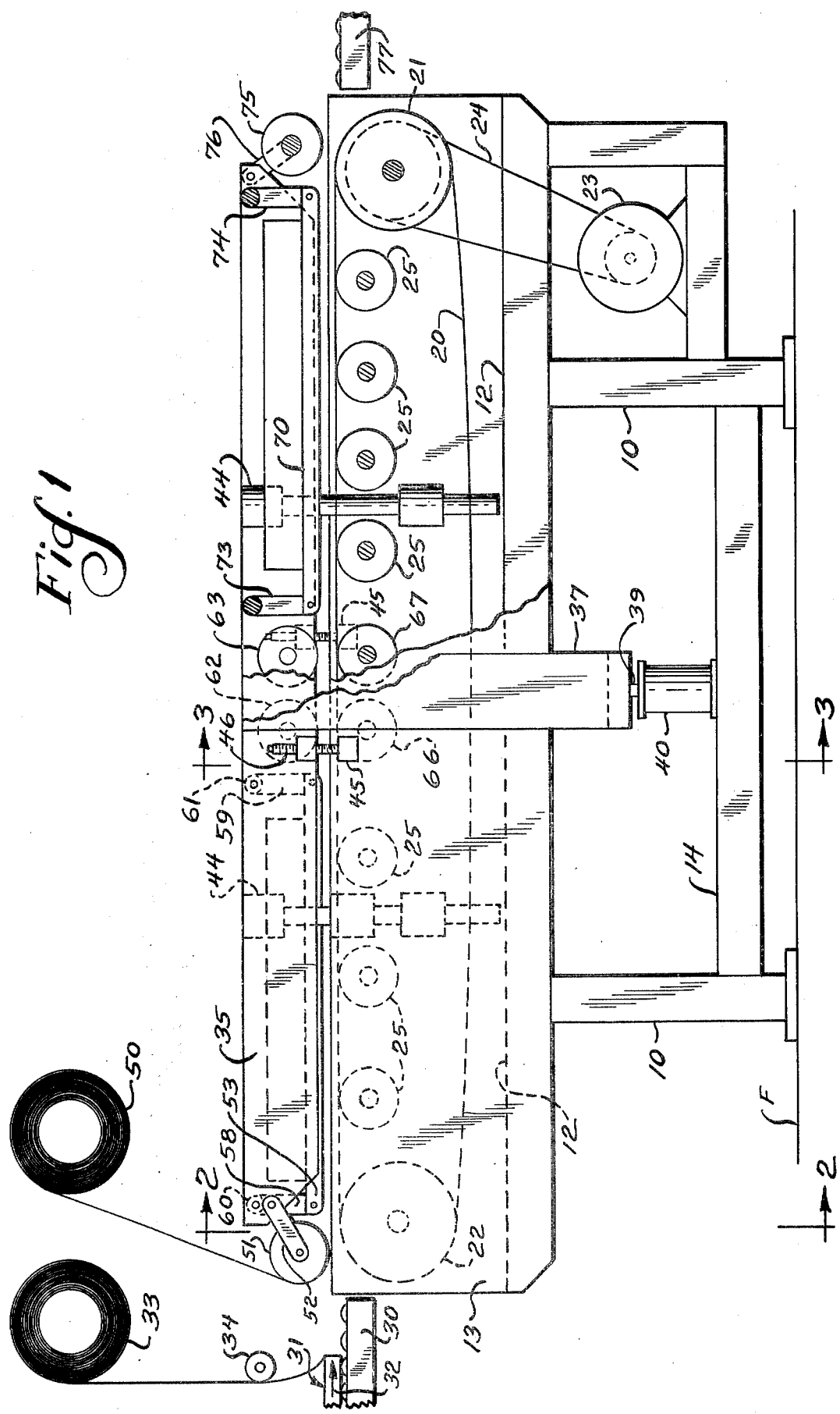

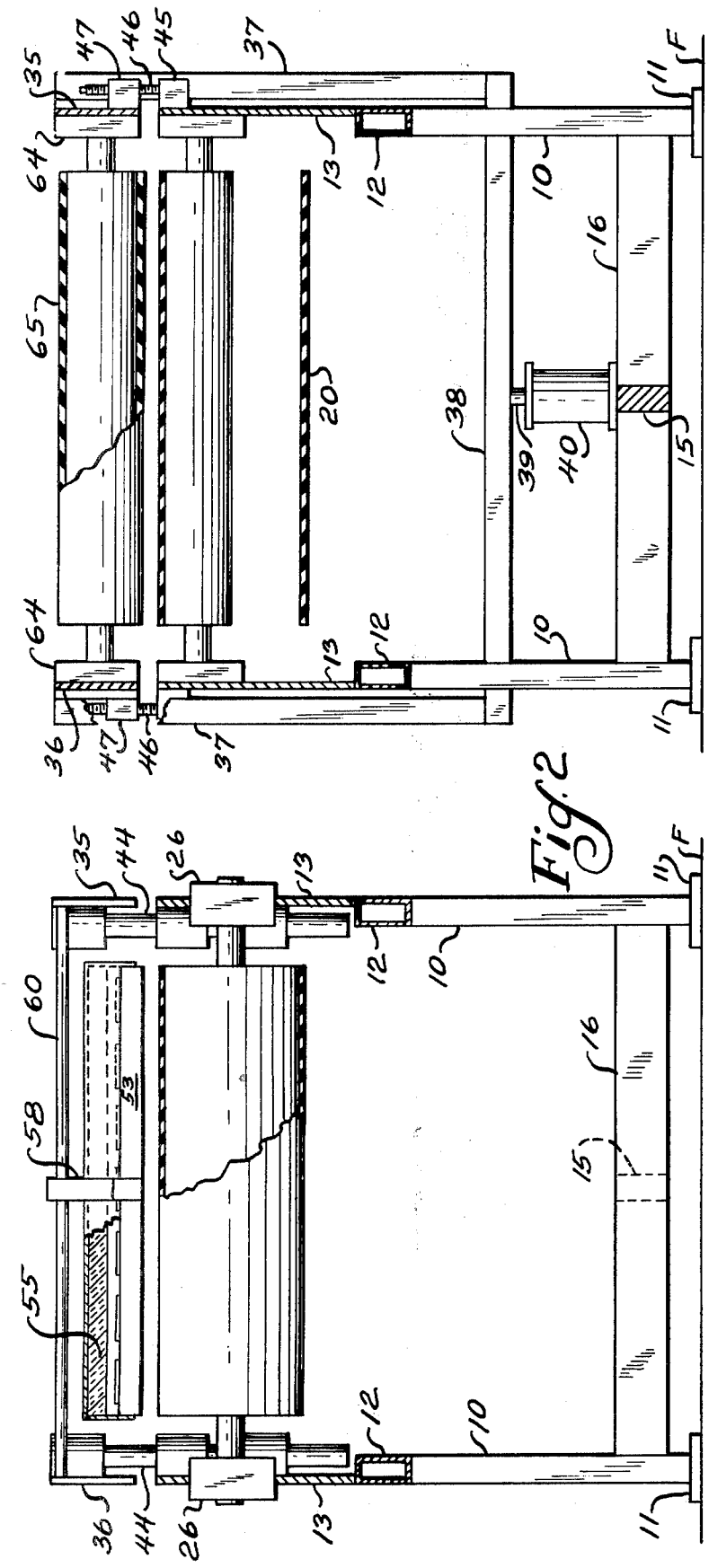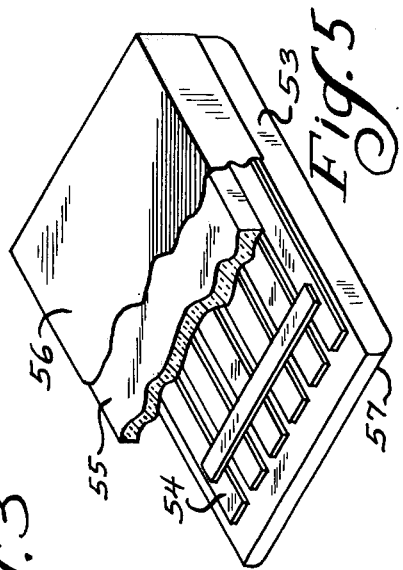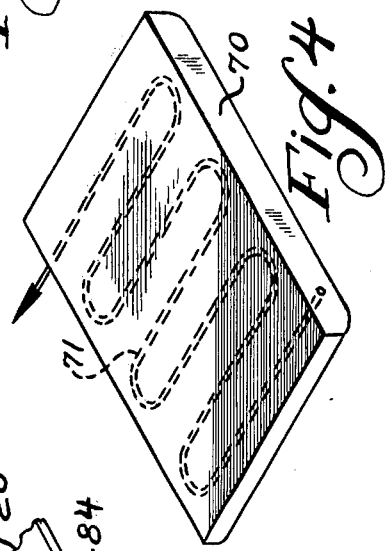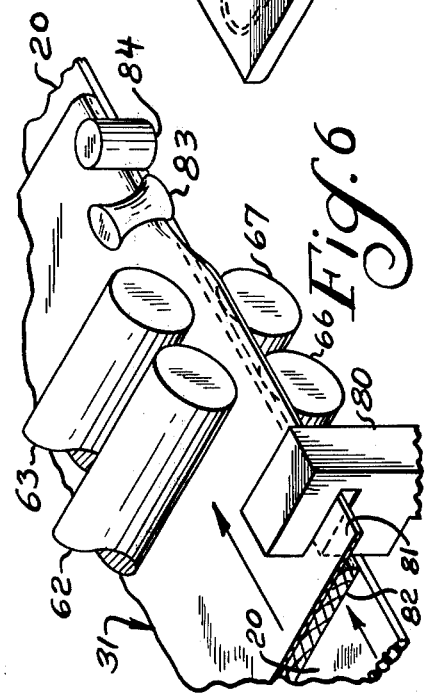

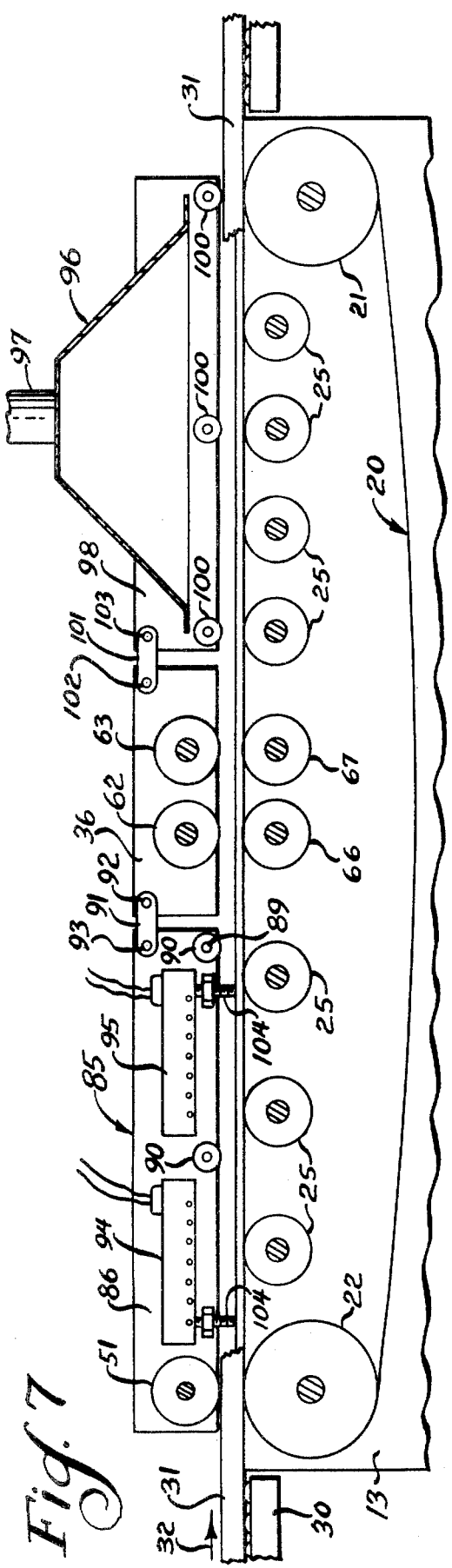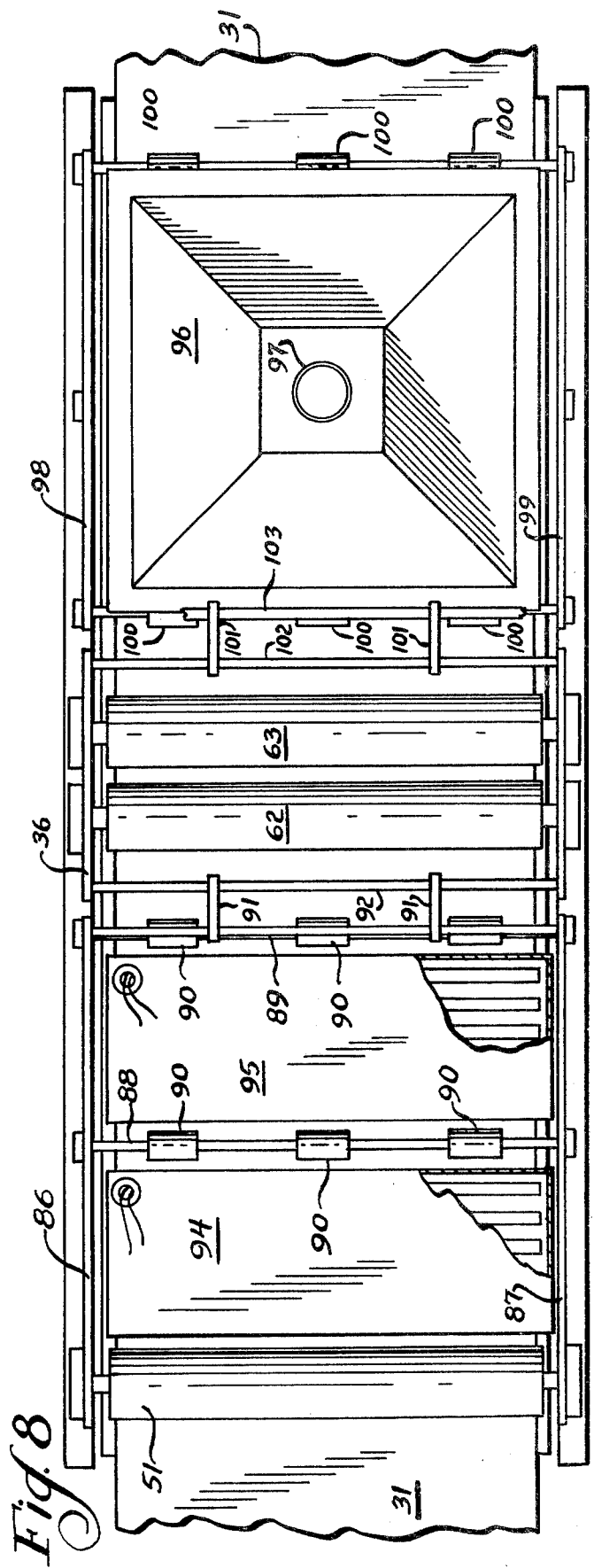

SURFACE LAMINATING MACHINE

This application is a continuation-in-part of my copending application Ser. No. 723,026 filed Sept. 13, 1976, now abandoned.

BACKGROUND OF THE INVENTION

The typical laminating manufacturing employs an in-line process wherein the core material and the laminate are brought together with the necessary coating equipment for application of adhesives, the necessary protective equipment exhausting solvents and drying ovens and the like. A description of such a typical in-line system is contained in the March, 1976 issue of "Wood and Wood Products" beginning at page 98.

The use of high viscosity hot melt adhesives in edge banding is disclosed in U.S. Pat. No. 3,730,823. The superior qualities of such high viscosity hot melts, those of a viscosity of 60,000 to 90,000 centipoises at about 200° C. (375°–400° F.) as measured by a Brookfield machine, are well known in the edge banding art, but have not been successfully applied to surface laminating of panels of 30" to 4' wide.

Only one machine is known to applicant for attempting the hot melt adhesive application to surface materials, this being a machine made in Italy under the name of Salgo, which incorporates a heating and roller application of hot melt adhesive to the laminate. This machine has not been successful in practical operation.

SUMMARY OF THE INVENTION

The present invention comprehends a method of laminating a laminate to a core by forming a sandwich thereof at ambient temperatures and then progressively heating the adhesive layer from the ambient temperature progressively to a tackiness and then to activating temperature in a band extending across the width of the material and progressing lengthwise of the sandwich. Immediately upon the adhesive reaching an activating temperature, the same is migrated physically into intimate contact with all of the fibers of the laminate and the core to fill all interstices and to wet out both surfaces. Immediately following the migration of the adhesive the same is cooled progressively in a band across the width of the panel and progressing lengthwise of the sandwich to reduce the adhesive to its mechanical bonding temperature. The sandwich will exit from the machine at a temperature wherein it can be physically handled by workmen. Any adhesive operable as stated may be utilized.

A unique commercial value of the present method lies in those uses wherein the factory employing the same does not have to have the equipment and controls to melt and apply hot melt adhesives. Such processes are difficult to control. In the present method, the adhesive may be sandwiched from a sheet or web of preformed hot melt adhesive or it may be precoated either upon the laminate or the core. Such sheets of high viscosity hot melt adhesive have become known in the art as "glue line".

The invention comprehends a machine for utilizing high viscosity hot melt adhesives for producing a superior laminate wherein extreme attention to the conditions of lamination is not required due to the fact that the method possible with the machine employs conditions increasing the margin for error for securing a good laminate.

It is an object of this invention to produce a superior laminate with hot melt adhesives utilizing particularly high viscosity adhesives which offer desirable advantages, such as non-toxic, non-flamable, unlimited shelf life, a high quality of mechanical bond and a lower energy consumption during processing, as well as cleanliness of the environment surrounding the processes in the factory.

It is also an object of this invention to provide a machine which is easily maintained and operated and can provide good lamination with operators trained with ordinary factory manufacturing skills, even though the surface material may be considered delicate to the point of being easily damaged.

DESCRIPTION OF THE DRAWINGS

FIG. 1 is a side elevational view, partially broken away and partially diagrammatic, of one machine for carrying out the method of the present invention;

FIG. 2 is an upright sectional view taken substantially along line 2—2 of FIG. 1 with certain parts of the machine removed for clarity of illustration;

FIG. 3 is an upright sectional view taken substantially along line 3—3 of FIG. 1 with parts of the machine broken away and parts removed for clarity of illustration;

FIG. 4 is a diagrammatic, broken, perspective view of the cooling shoe forming a part of the machine;

FIG. 5 is a broken, perspective view, partially diagrammatic, of the heating shoe in the machine;

FIG. 6 is a broken, substantially diagrammatic, perspective view of an additional feature capable of incorporation in the machine for producing a particular shape of laminate edge.

FIG. 7 is a broken, partially sectioned, upright view through an alternate of machine illustrated in FIG. 1, and FIG. 8 is a top plan view, partially broken away, of the machine illustrated in FIG. 7.

DESCRIPTION OF THE PREFERRED EMBODIMENT

In forming the laminate of the present invention, it is generally contemplated that a core material, such as a particle board of some 4'×8' size, would form the base of a sandwich. Over the surface of the core, a sheet of hot melt adhesive, which is non-tacky at room temperature, may be laid and cut to the size of the core. Such adhesive (called a glue line) is available in sheet form of from 3 to 10 mil thickness and is easily handled from rolls with or without release paper wound in the spiral of the web of adhesive. A laminate material is indexed over the adhesive to complete the sandwich at room temperature.

The sandwich so formed is fed into a machine which will carry the sandwich through the various steps employed in the method for producing a mechanically bonded laminate to the core. The leading edge of the sandwich is subject to heat conducted through the laminate to the adhesive so that the adhesive becomes tacky, which aids in holding the laminate to the core in its indexed sandwiched position. The heating is applied in a band across the width of the sandwich and progresses lengthwise of the assembly to progressively heat the adhesive to its activating temperature, in the case of a high viscosity hot melt adhesive, of between 375°–400° F. Once the adhesive and the adjacent parts of the sandwich reach the activating temperature, the adhesive is physically migrated into intimate contact with both laminate and core, in a time and relationship such that the adhesive cannot lose sufficient temperature to prevent a wetting out of the adjacent laminate and core surfaces. Once the migration has occurred, a cooling of the laminate is immediately effected in a band across the sandwich progressively extending over the length of the sandwich to reduce the adhesive and adjacent sandwich surfaces to a mechanical bonding temperature of the adhesive, generally around 160° F. in the case of the high viscosity hot melt adhesive. At this point, the sandwich may be physically handled by workmen and the mechanical bond achieved is set, holding the laminate to the core in the position at which it was placed when the adhesive was caused to migrate as specified.

A preferred and an alternate machine for carrying out the method described, is illustrated in the accompanying drawings, to which reference is now made. The machine has a base frame comprising four upright legs 10 having pads 11 at their lower ends for supporting the machine upon a factory floor F so that the working parts of the machine are at a convenient height for workmen standing on the floor. Side rails 12 of structural integrity join the upper end of the legs running lengthwise of the machine in order to support upright structural plates 13 forming the main frame of the machine. The lower ends of the legs are suitably braced by longitudinal brace 15 and cross braces 16 in order to support adequately an upper frame member.

The main frame supports a belt 20 with a high friction surface reeved about a driven roll 21 and an idler roll 22 so that the upper reach of the belt can be approximately 80" long from the idler roll 22 to the driven roll 21. A variable speed electric motor 23 drives a suitable flexible drive chain 24 to the driven roll 21. The belt is supported intermediate rolls 21 and 22 by a number of idler rolls 25 spaced apart rather evenly so that the upper reach of the belt will provide a continuous straight line support for a sandwich to be laminated. Appropriate bearing housings 26 (FIG. 2) are provided for the large rolls 21 and 22 and similar bearing blocks are provided for the rolls 25 attached to the side plates 13. Generally the belt is about 4' wide in order to accommodate 4' width material. The rollers 21, 22 and 25 are of approximate equal width with the belt. While the electric motor 23 is controllable in speed in order to change the speed of the belt travel, it is generally set at about 12' to 20' per minute, depending upon the amount of heat applied.

Infeed conveyor 30 is provided so that a sandwich 31 may be made up thereon at ambient temperatures intended to travel in the direction of the arrow 32. If convenient, the adhesive may be supplied from a roll 33 past a guide roller 34 on the top of the substrate as illustrated. When the sandwich is made up, it may be propelled manually toward the machine until the belt takes over the drive thereof through the various stages of operation.

The machine has an upper frame comprising primarily a pair of side plates 35 and 36 suitably cross braced, such bracing not being illustrated. The frame is supported on the lower frame by a pair of spaced upright side support posts 37 joined by a lower cross beam 38 resting upon the rod 39 of a double acting pneumatic cylinder 40. The upper ends of the posts 37 are connected rigidly to the upper frame plates 35 and 36 respectively and the upper frame is guided relative to the lower frame by four ball-bushing vertical guides 44 appropriately spaced apart longitudinally and side to side so that the upper frame may move vertically relative to the main frame under the influence of the pneumatic cylinder 40. Stops are provided to support the weight of the upper frame when air is exhausted from the cylinder and in this respect, a block 45 is secured to the plates of the lower frame so that a screw member 46 threaded through a block 47 on the upper frame plate may be adjusted to limit the lowering travel of the upper frame relative to the lower. At least a pair of such stops are provided on opposite sides of the machine. The stops may be adjusted to support the upper frame at a position to gap the pressure rolls over the belt and back up at the thickness of the core material so that the sandwich will have at least the weight of the upper frame thereon.

After the sandwich is formed either by laying up, in sequence, a core, a layer of ambient temperature hot melt adhesive and a laminate on the infeed conveyor 30, it may be forwarded to the machine. In some instances, the laminate may be provided in a roll form 50 and fed around an infeed smoothing roller 51 supported on pivoted hangers 52. Smoothing roller 51 may smooth out any warpage in the laminate and provide a grip between the sandwich and the conveying belt 20. Immediately as the sandwich is forwarded, it engages a heating shoe 53 diagrammatically illustrated in FIG. 5. The shoe may be formed of aluminum or a chrome plated steel having electrical strip heaters 54 therein covered by a layer of insulation 55 and a cover 56. Thermostatic controls are provided for the strip heaters. The inner approaching edge 57 of the shoe is rounded so that it may ride upward on the upper surface of the sandwich.

Referring to FIG. 5, the shoe 53 is centrally supported upon a pair of pivoted hangers 58 and 59, fore and aft of the shoe and centrally thereof, which hangers are in turn supported upon rods 60 and 61 extending between the two side plates 35 and 36 of the upper frame. These hangers permit the shoe to rise under the action of the incoming sandwich and to tilt from side to side sufficiently so that the highly polished smooth lower surface will maintain good contact with the laminate of the sandwich. The contact is of light unit pressure, but sufficient to hold the laminate down and to progressively heat through the laminate to the adhesive layer raising the adhesive first to a tackiness which aids in keeping the registration and then to the activating temperature at which the adhesive may be physically migrated because of its fluid state. The hot melt adhesives contemplated are not liquid at the activating temperatures, such that they would flow by gravity, but can be migrated under physical pressure.

The physical migration is brought about by a pair of pressure rollers 62 and 63 supported in the upper frame on appropriate pillow block bearings 64 and provded with a silicon rubber coating 65 so as to not be deleteriously affected by the heat. Back-up rolls 66 and 67 below the belt 20 are immediately opposite the pressure rollers. The use of a commercially available pneumatic four-way valve and a pressure regulator controlling air pressure in the cylinder 40, allows various pressures to be applied to the pressure rolls. In the present machine, 12 lbs per sq. in. occurs on the sandwich without pressure in the cylinder. The pressure may be varied to provide up to about 400 p.s.i. on the sandwich with the use of usually available shop compressed air. It may be noted that the heating shoe lower surface when hanging at rest (FIG. 1) is slightly below the lower nip of the pressure rolls ensuring physical contact between the heating surface and the laminate on a sandwich being processed.

It is important to note the longitudinal spacing between the heating shoe and the pressure rolls when the sandwich exits the heating shoe. The adhesive will be at the activating temperature of about 375°-400° F. leaving the heating shoe and will lose a few degrees, perhaps 5, when travelling through the short 2-3" space beyond the shoe to the pressure rolls. This loss is not enough to affect the activating temperature so that the migration under the pressure rolls may occur while the temperature is in condition to wet out the facing surfaces. Activating temperature is needed to obtain the best and most complete mechanical bond throughout the extensive surfaces of core and laminate.

As soon as the sandwich progresses beyond the pressure rolls, it is contacted by a cooling shoe 70. In FIG. 4 this shoe is shown as an aluminum shoe having water flow passages 71 therein. The shoe 70 is similarly supported upon pivoted hangers 73 and 74 from the upper frame of the machine. The shoe lower surface is polished and smooth to avoid damage to the laminate exposed surface. The shoe is movable both longitudinally and tiltable sidewise so as to conform to the surface of the sandwich. The extraction of heat is through conduction from the laminate and the adhesive therebelow. Cooling is progressively occurring across the width of the sandwich and along its length as the sandwich progresses, so that the temperature may be reduced to the mechanical bonding temperature of the adhesive as the sandwich exits. A lightweight pressure roll 75 supported on pivot hangers 76 at the exit merely ensures the feed out of the sandwich from the machine onto an outfeed support 77. The temperature is reduced sufficiently so that the sandwich may be handled by workmen. When the sandwich reaches the outfeed support, the adhesive will have set up its mechanical bond.

Some modifications of the heating shoe may occur to accommodate particular laminating materials. Some decorative surfaces are formed on very thin paper ordinarily precoated on its backside with the adhesive for securing the laminate to a base core. Similarly, metal foils, as thin as one mil thickness, can be precoated and fed from a supply roll, such as the roll 50, on to the sandwich. In each such instance, the heating shoe may comprise a heated roll of cylindrical form so that several inches of heating surface may be in contact with the metal foil or decorative paper to heat through the laminate to the adhesive. Alternatively, heat may be directed toward the adhesive so precoated upon a laminate either through the blowing of superheated air directly against the adhesive precoated on the laminate, or with the use of radiant heaters with sufficient control to provide a raising of the adhesive temperature to the activating temperature as the laminate is brought into its contact position with the core. While the heating shoe for the surface laminating described is a generally flat highly polished surface, it is thus contemplated that the shoe might be a cylindrical heated roll or the material trained about a roll with heat supplied by radiant or superheated air heat sources.

It is important that the high viscosity hot melt adhesives be raised to the activating temperature whether it be a hot melt adhesisve of the 60,000 to 90,000 centipoises referred to above or a hot melt of somewhat lesser high viscosity. Generally, hot melt adhesives above 10,000 centipoises at 200° C. have been considered of the high-viscosity type and it is these high viscosity hot melt adhesives with which the use of this surface laminating machine is particularly useful.

Heating through a thin wood veneer or printed surface paper composition laminate of whatever nature, requires the heating of the laminate, as well as the adhesive below it and will result in sinking some heat into the particle board or other substrate. While such a quantum of heat applied to the sandwich increases the time available from the heating element to the pressure rolls for migrating the so activated adhesive to wet out the substrate and laminate surfaces, it does require careful attention to ensure the raising and maintaining of the temperature of the adhesive to activation while wetting out the surfaces to be joined. Some decorative surfaces are quite delicate and subject to marring with the frictional contact of even highly polished inductive heating and cooling shoes. In such instances, the machine may utilize heating elements out of contact with the laminate surface and cooling means out of contact with the sandwich. In FIGS. 7 and 8, such a modification of the machine is illustrated. Therein, a heating section 85 of the machine comprising the frame rails 86 and 87 adequately held in rigid spaced position by a number of spacer rods 88,89 may rest lightly but with its entire weight upon the sandwich through the large smoothing inlet roll 51 and a number of small rubber rolls 90 supported in the lower part of the frame so that the weight of the frame rests on the sandwich. A pair of spaced links 91 pivoted to the central portion 36 of the machine frame by being pivoted on cross rod 92 and in turn to the heating section frame by pivoting to rod 93 assures the orientation of the heating section over the incoming sandwich. Electrical strip heater sections 94 and 95, provded with conventional electrical leads, are mounted in the heating frame to radiantly heat those portions of the sandwich passing therebeneath, the heaters being arranged in tandem with the supporting rolls 90 and not over them. Temperature sensors may be utilized to vary the speed of the belt 20 carrying the sandwich through the machine to ensure sufficient heating time to raise the adhesive to the activating temperature. Parts of the machine that are the same as illustrated in FIGS. 1-3 bear the same reference numbers.

By mounting the heating units 94 and 95 shown in FIGS. 7 and 8, in the upper frame 35 of the FIG. 1 machine, it is possible through the use of the non-contact radiant heating source to feed a laminate structure onto the activated hot melt adhesive following the heating section and immediately before the sandwich passes into the pressure roll couples 62-66 and 63-67. In such instances, the heat radiantly would be applied directly to the adhesive and an adequate supply of laminating thin material be fed into the machine between the heating section and the pressure rolls. Such operation avoids heating the decorative laminate material to the adhesive activating temperature but should be utilized with enough heat in the substrate to provide plenty of time to feed in the laminate before the adhesive loses heat to below activation temperature.

In the machine shown in FIGS. 7 and 8, the migration of the adhesive to wet out the surfaces of laminate and substrate are the same as described for the operation of the machine of FIGS. 1-3. The cooling section, however, may utilize an air stream directed over the laminate as it exits the pressure migrating rolls. Thus, in FIGS. 7 and 8, a hood 96 is shown with an air inlet 97 at its center through which an air stream may be directed down over the sandwich to exit under the side rails 98 and 99 of the cooling frame. This is possible since there is no solvent being evaporated from the belt melt adhesive which is all solids. The cooling frame is, similarly to the heating frame, provided with small rubber rolls 100 carrying the weight of the frame upon the sandwich and is guided in proper position by a pair of links 101 similarly pivotally connected to a rod 102 secured to the central pressure roll frame 36 and a rod 103 joining the side rails 98,99 of the cooling frame. Ordinarily, ambient factory air may be drawn into the hood and utilized for adequate cooling. Such air may be passed over a cooling coil to increase the speed of heat extraction from the sandwich should production running of the machine move the sandwich at such a rate such that additional cooling is desired.

The machine of FIGS. 7 and 8 is particularly desirable when laminating extremely thin wood veneer, fragile and thin foils or other laminates which could be easily damaged by frictional contact therewith before being mechanically locked into position on the substrate through the hot melt adhesive's bond to both the laminate and substrate. Adjustable stops limiting the gravity induced movement of the heating and cooling sections toward the machine base rails 13 may be provided where needed such as indicated at 104. The weight of the heating frame on the support rollers is sufficient to smooth the laminate upon the sandwich but does not interfere with the smooth progression of the sandwich through the machine propelled by the belt 20.

Many cabinet drawers, drawer fronts and similar furniture components may have curved edges rather than flat surfaces from side to side of the panel. Referring to FIG. 6, an auxiliary heater 80 may be provided to heat that portion 81 of the laminate extending beyond the curved edge of core 82. High viscosity hot melt adhesive ought be precoated on the laminate in this instance. When so heated to activating temperature, the adhesive will be fluid but not flowable by gravity. Contour pressure roll 83 and edge roll 84 may be mounted in the upper frame to move the laminate into conformity with the curved section of the core 82. Other contoured rollers may be utilized in the machine by appropriately mounting them in the upper frame.

In prior known laminating processes, adhesives have been raised to their activating temperature and by coating, spraying and the like, brought into contact with core and laminating surfaces which extract heat from the adhesive. In the industry, there has been a reference to "open time" as being the amount of time available during which the laminate and core may be moved relative to each other with the adhesive between them, before the adhesive would lose sufficient heat to be below its activating temperature. In known processes such open time could be as low as 1 to 3 seconds. The present invention provides an operation in which open time is of no concern to the user of the machine. The adhesive in the present invention is heated in a manner that it will retain sufficient heat and remain at its activating temperature a much longer time than is needed to move the laminate relative to the core or vice versa to position the components of the sandwich into the final position desired while the adhesive is still activated. Whether the adhesive is heated through the laminate (or core) or heated by radiant or superheated air sources, which will place heat in the laminate in either case, makes "open time" of no concern since the migration will occur almost immediately. The migration of the adhesive after it is heated may thus wet out all surfaces and effectively be held in proper position until the component parts of the sandwich can be cooled to a temperature at which the adhesive will mechanically set up its bond. The light pressure supplied by the cooling element prevents any warping memory of the components from taking effect during the cooling until the mechanical bond is set. In laminating thin metal foils or very thin paper laminates, as mentioned above, air cooling in ambient factory conditions may be sufficient without mechanically extracting heat from the sandwich. When working with a sufficiently self-supporting substrate or core material, the belt 20 may be dispensed with in favor of supporting rolls 25 alone, each of which will be provided with drive at the same surface speed.

The foregoing disclosure of specific embodiments is illustrative of the broad inventive concepts comprehended by the invention.

I claim:

1. A machine for surface laminating materials with high viscosity, hot melt adhesive, consisting essentially of:

a frame, conveying means on the frame for carrying and moving a sandwich of core, adhesive and laminate in a path through the machine with the laminate uppermost and exposed to ambient atmosphere, heating means above the conveying means having means for applying heat to the adhesive for progressively raising the temperature of the sandwich adhesive from ambient to tackiness to activating temperature across the width of the sandwich and in progression lengthwise of the sandwich, first support means secured to said machine supporting said heating means above the sandwich including means providing low unit pressure application to the sandwich in an amount up to the weight of said first support means and said heating means, said means for providing low unit pressure to the heating means comprising pivoted links secured to said machine and to one end of said first support means and at least one roller on said first support means in contact with said sandwich to provide said low unit pressure to the sandwich, pressure applying means above and below the sandwich path and immediately adjacent the heating means for physically migrating the activated adhesive into intimate contact with the core and the laminate, cooling means above the conveying means immediately following the pressure applying means and having heat extraction means for progressively extracting heat from the adhesive reducing the adhesive's temperature from activating temperature to a lower mechanical bonding temperature, second support means on said machine supporting said cooling means above the sandwich including means providing low unit pressure application to the sandwich in an amount up to the weight of said second support means and said cooling means, said means for providing low unit pressure to the cooling means comprising pivoted links secured to said machine and to one end of said second support means and at least one roller on said second support means in contact with said sandwich to provide said low unit pressure to the sandwich, said respective heating, pressure applying and cooling means being spaced closely together in tandem preventing substantial change in temperature of the adhesive while said sandwich is moving between said means so as to mechanically bond said core and laminate in the position occupied exiting the pressure applying means.

2. A machine as specified in claim 1 wherein said pressure applying means are rolls supported in a second frame positioned above the conveying means with means supporting said second frame on the machine frame for controlled movement toward and away from the conveying means at selected pressure application to the sandwich.

3. A machine as specified in claim 1 in which the conveying means is a single belt coextensive with the path of the sandwich past said heating means, pressure applying means and cooling means, said belt having a surface for gripping the sandwich material supported thereon.

4. A machine as specified in claim 1 wherein said heating means are electrical radiant heaters suspended in the machine above the conveying means for out of contact heating of the adhesive.

5. A machine as specified in claim 1 wherein said cooling means includes a hood secured to the machine in out of contact relation to the sandwich for directing a flow of ambient air over the sandwich exiting the pressure applying rolls to convey heat therefrom into ambient surroundings.

6. A machine for surface laminating a sheet laminate upon the surface of a core material with mechanical bond throughout the extent of interfaced surfaces of laminate and core, said core material, a high viscosity, hot melt adhesive and laminate forming a sandwich, comprising:
 a machine frame,
 a driven belt in the frame for speed controlled passage of the sandwich through the machine exposed to ambient atmosphere,
 a heat applying shoe contacting the uppermost surface of the sandwich having means for heating and applying said heat to the sandwich through the upper portion thereof gradually raising the adhesive temperature above ambient temperature first to tackiness and then to activation temperature,
 pivoted hangers secured to said machine frame and to said heat applying shoe to suspend the shoe for light unit pressure contact with the laminate and to prevent substantial pressure on the sandwich,
 pressure applying rolls immediately in tandem following said heat applying shoe for migrating said activated adhesive into intimate contact with core and laminate facing surfaces, said rolls being both above and below the sandwich and pinching the sandwich between them,
 a heat extracting shoe immediately in tandem following said pressure applying rolls and contacting the uppermost surface of said sandwich, said shoe having means for extracting heat progressively from the sandwich to lower the temperature of the adhesive to a mechanical bonding temperature at the exit of the sandwich from under the shoe,
 and pivoted hanger means for supporting said heat extracting shoe from the machine frame for applying only light unit pressure to the sandwich and for preventing substantial pressure to the sandwich.

7. A machine as specified in claim 6 wherein the pressure applying rolls extend across the width of the sandwich and auxiliary rolls are shaped to sandwich edge contour and apply pressure to the edges of the sandwich.

8. A machine as specified in claim 6 wherein a movable frame is supported above and on the machine frame and in turn supports said heat applying shoe, said pressure applying rolls and said heat extracting shoe above the conveyor, said movable frame being supported with an upright motion producing means controllable to provide desired pressure between said rolls and a sandwich on said conveyor.

9. A machine as specified in claim 8 wherein each shoe has a floating attachment to said movable frame and a smooth lower surface for heat conductive contact with the uppermost surface of the sandwich on the conveyor.

* * * * *